Figure 1:
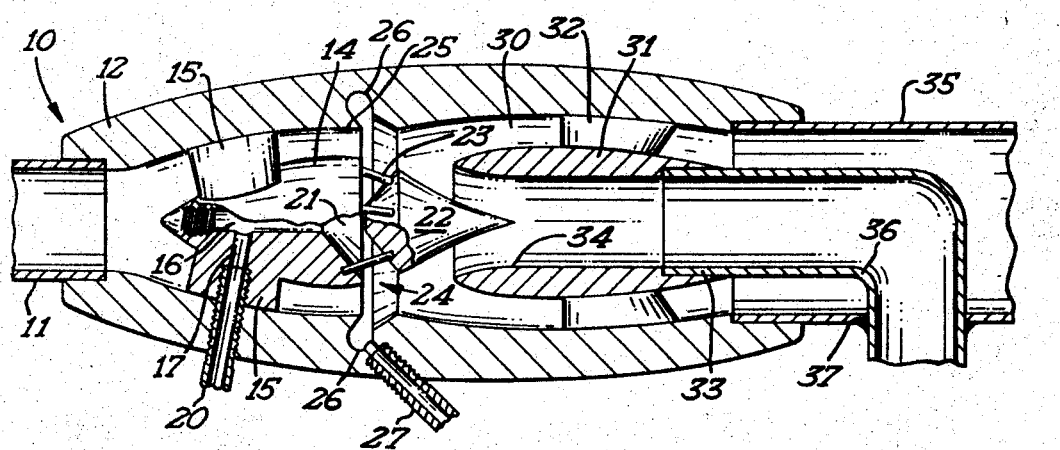

June 19, 1962 W. L. CARLSON, JR 3,039,490
CYLINDRICAL FLUID AMPLIFIER
Filed May 11, 1961

INVENTOR.
WILLIAM L. CARLSON JR.
BY

United States Patent Office

3,039,490
Patented June 19, 1962

3,039,490
CYLINDRICAL FLUID AMPLIFIER
William L. Carlson, Jr., Bloomington, Minn., assignor to Minneapolis-Honeywell Regulator Company, Minneapolis, Minn., a corporation of Delaware
Filed May 11, 1961, Ser. No. 109,336
7 Claims. (Cl. 137—610)

The present invention is directed to a fluid control device known as the fluid amplifier, and is more specifically directed to a fluid amplifier having a cylindrical configuration as opposed to the usual flat configuration.

A fluid control device has recently been invented by men at the Diamond Ordnance Fuze Laboratory. The basic operating principle of the fluid operated device or fluid amplifier has been quite widely publicized in the literature and is covered in a number of pending patent applications. One of the original fluid amplifiers is fully disclosed in a patent application of Billy M. Horton which was filed on September 19, 1960, and carries the Serial No. of 51,896. A fluid amplifier of a different configuration and operating on an induction principle, as opposed to a pressure differential principle of Horton, was invented by Richard J. Reilly and filed upon on September 16, 1960, as application carrying Serial No. 96,645. Both of the fluid amplifiers utilize the principle of directing a flowing fluid between one or more outlet channels depending upon a pressure differential or fluid flow that is added at a side of the main fluid flow. The fluid added is of very small proportion to the main fluid stream and therefore the device is an amplifying device. This amplifier technique has been developed and disclosed in a flat configuration. The normal fluid amplifier has rectangular channels both for the main fluid flow and for the control fluid flows. The use of rectangular channels in these devices simplifies their construction in some ways but this simplification adds an undesirable feature, the impedance and turbulence created by a flow of fluid in a unit having a corner. In order to overcome this, the present cylindrical fluid amplifier has been developed.

The present cylindrical fluid amplifier utilizes the principles of the fluid amplifiers developed by Horton. The basic control theory used by either Horton or Reilly can be applied to the present invention, even though the present application only shows one of the arrangements in the drawing and specification.

It is a primary object of the present invention to disclose a fluid amplifier of cylindrical configuration that has reduced the turbulence generating corners of the conventional types of fluid amplifiers.

It is a further object of the present invention to disclose a fluid amplifier that can utilize conventional construction techniques and existing tubular members and parts.

Yet another object of the present invention is to disclose a cylindrical fluid amplifier that is capable of being constructed to utilize any of the fluid amplifier operating principles.

These and other objects will be apparent when the present specification is considered with the drawing.

Figure 2:
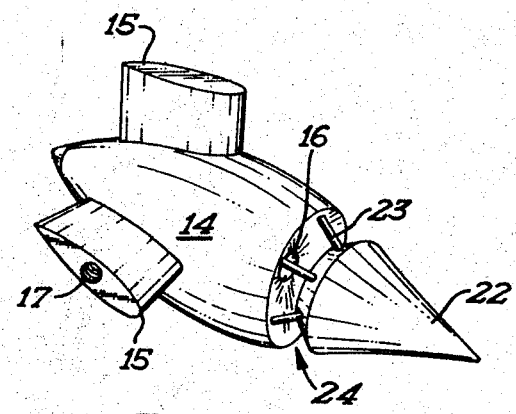

FIGURE 1 of the drawing is a cross-section of a cylindrical fluid amplifier, and;

FIGURE 2 is an isometric view of a tear-shaped divider supported within the fluid amplifier of FIGURE 1.

In FIGURE 1 there is disclosed an inlet means 10 generally made up of conventional tube 11 passing into the cylindrical fluid amplifier body 12. The fluid amplifier body 12 is generally cylindrical in shape and has a cylindrical opening 13 in which a tear-shaped divider 14 is supported by three supporting fins 15. The tear-shaped divider 14 has a central passage 16 that opens from a passage 17 in one of the fins 15. The passage 17 in turn is connected to a threaded pipe 20 that forms one of the inlet means for control fluid for the unit.

The passage 16 opens at 21 in a flared fashion against a cone-shaped end 22 that is supported by a plurality of pins 23. The pins 23 hold the end 22 in place forming an annular opening generally shown at 24 so that any fluid entering the pipe 20 can flow through the central passage 16 ad spread in an outward annular flow. The tear-shaped divider 14 along with the wall 25 of the body 12 forms a fluid passage having an annular configuration and which passes around the outside of the tear-shaped divider 14. Cut into the body 12 is an annular ring or groove 26 that is connected to a threaded pipe 27. The threaded pipe 27 is provided to supply a second control fluid inlet means that allows fluid to pass into the ring or annular channel 26 thereby supplying a fluid flow in an annular fashion inwardly towards the annular opening 24.

To the right of the annular opening 26 there is an annular outlet path 30 that is formed between the main body 12 and a pipe like outlet 31 that is supported by fins 32 within the body 12. At the right end of the tube 31 is an angled pipe 33 that passes out of the fluid amplifier but that is in fluid communication with the interior 34 of the pipe 31. Closing the end of the fluid amplifier is another pipe 35 that is concentric with the pipe 33 over part of its length. The pipe 33 bends at 36 and passes through pipe 35 at 37 in a fluid tight manner. The pipes 33 and 35 form concentric fluid outlet means that can remove the fluid either from the center of the fluid amplifier or from an annular ring of fluid on the outer periphery of the fluid amplifier channel. The exact details of construction of this particular fluid amplifier are not of great importance other than to show the principle of operation and many structural refinements have been omitted for simplicity's sake.

In FIGURE 2 the tear-shaped divider 14 is shown in isometric in order to clearly show the structural arrangement of the parts. It can be seen that the fins 15 are provided to support the divider 14. The isometric view also shows more clearly the pins 23 that form the support of the end member 22 thereby forming the fluid outlet passage 24. The fluid amplifier specifically described in FIGURES 1 and 2 utilizes the principle of operation disclosed in the Horton application. The same general configuration of fluid amplifier could be built utilizing the principles of the Reilly application but for simplicity and clarity's sake an amplifier of the type utilizing the teaching of Reilly has not been specifically disclosed.

The operation of the unit is relatively simple and will be briefly described when the unit is considered as operated on a fluid such as water. While the unit is specifically described as operating on water it should be understood that the unit can be operated on any type of fluid whether the fluid is in the form of a liquid, a gas, or a combination of the two. The present invention can be used in any type of material that will flow when placed under pressure. The fluid, such as water, is introduced into pipe 11 and passes into the fluid amplifier body 12 at the back of the tear-shaped divider 14. The fluid or water entering divides around the tear-shaped divider 14 and forms an annular ring of fluid that adheres to and fills the space between the divider 14 and the body 12 of the fluid amplifier. By the time the water or fluid reaches the discontinuity in the tear-shaped divider 14, along which the opening 24 lies, the fluid is flowing in a cylindrical stream.

If a pressure differential is applied between the pipes 20 and 27 a switching action on the flow of fluid will occur.

The easiest pressure differential to consider is in the form of the application of a water pressure to either pipe 20 or 27, even though it is not necessary to apply pressures to one or the other as only a pressure differential is required to control the unit. If, however, a fluid pressure is applied to pipe 20, the fluid or water flows through opening 17 into the central passage 16 and flows out of the cone-shaped opening 21 to the annular outlet generally shown at 24. The flow of the fluid out of the opening 24 impinges against the flow of fluid around the outside of the tear-shaped divider 14 and the flow is dvierted to the outer walls of the amplifier body 12. The flow then attaches itself to these walls by a pressure differential as detailedly described in the Horton application. The water after attaching to the outer walls passes into the channel 30 and flows through the pipe 35 to perform any function that is desired.

If it is desired to switch the fluid flow from the outer concentric fluid outlet passage it is merely necessary to apply a water pressure to pipe 27 thereby applying an annular ring of fluid from the channel 26 inwardly toward the fluid flowing around the divider 14. The pressure applied concentrically to the outside of this fluid flow forces the fluid to flow down inwardly around the tip 22 and into the center pipe 34 where it passes out of the pipe 33 at 37.

It is thus apparent that by applying a pressure differential across the pipes 20 and 27, it is possible to switch the fluid amplifier from one mode of operation to the other. In the presently disclosed unit the teaching of Horton is applied. If the teaching of Reilly were applied, the configuration of the slots would be slightly different and would utilize the induction of the main fluid flow to the water applied to pipes 20 or 27 thereby causing the main fluid flow to follow the applied fluid. It will be evident to one skilled in the art that this type of modification could be readily accomplished.

The present application has been directed to the concept of developing a fluid amplifier of a cylindrical configuration, as opposed to the normal flat configuration normally associated with the fluid amplifiers that have been described in the literature, and which are detailedly brought out in the Horton and the Reilly applications, previously referenced. The principle of operation of the device disclosed in FIGURES 1 and 2 could be put into many physical forms and the present applicant does not wish to be limited to the specific form or structure that has been disclosed. The applicant wishes the invention of the present application to be limited only by the scope of the presently appended claims.

The embodiments of the invention in which an exclusive property or privilege is claimed are defined as follows:

1. A cylindrical fluid amplifier including: main fluid inlet means providing an annular fluid flow stream of a fluid to be controlled; concentric fluid outlet means opposite said main fluid inlet means; said outlet means providing at least two fluid flow outlet paths; first annular control inlet means around said annular fluid flow stream; second annular control inlet means within said annular fluid flow stream; and pressure differential means applied to said control inlet means to shift said fluid flow stream between said outlet paths.

2. A cylindrical fluid amplifier including: main fluid inlet means providing an annular fluid flow stream of a fluid to be controlled; concentric fluid outlet means opposite said main fluid inlet means; said outlet means providing at least two fluid flow outlet paths each capable of handling all of the fluid flowing in said amplifier at any one time; a first annular control inlet around said annular fluid flow stream; a second annular control inlet within said annular fluid flow stream; and pressure differential means applied to said control inlets to shift said fluid flow stream between said outlet paths.

3. A cylindrical fluid amplifier including: an annular fluid inlet providing an annular fluid flow stream of a fluid to be controlled; two concentric fluid outlets opposite said fluid inlet; said outlets providing two fluid flow outlet paths each capable of handling all of the fluid flowing in said amplifier at any one time; a first annular control inlet around said annular fluid flow stream; a second annular control inlet within said annular fluid flow stream; and pressure differential means applied to said control inlets to shift said fluid flow stream between said outlet paths.

4. A cylindrical fluid amplifier including: main fluid inlet means providing an annular fluid flow stream of a fluid to be controlled; concentric fluid outlet means opposite said main fluid inlet means; said outlet means providing at least two fluid flow outlet paths; an annular control inlet directed inwardly toward said main fluid stream for introduction of a control fluid; and a second annular control inlet directed outwardly toward said main fluid stream for introduction of said control fluid; the application of said control fluid to a control inlet shifting said fluid flow stream between said outlet flow paths.

5. A cylindrical fluid amplifier including: an annular fluid inlet providing an annular fluid flow stream of a fluid to be controlled; two concentric fluid outlets opposite said fluid inlet; said outlets providing at least two fluid flow outlet paths each capable of handling all of the fluid flowing in said amplifier at any one time; an annular control inlet directed inwardly toward said fluid stream for introduction of a control fluid; and a second annular control inlet directed outwardly toward said fluid stream for introduction of said control fluid; the application of said control fluid to a control inlet shifting said fluid flow stream between said outlet flow paths in a direction away from said applied control inlet fluid.

6. A cylindrical fluid amplifier including: tubular fluid inlet means having a tear-shaped divider supported therein to provide an annular fluid flow stream of a fluid to be controlled; two concentric fluid outlet pipes opposite said fluid inlet means; said pipes separating in a fluid tight joint thereby forming two fluid flow outlet paths each capable of handling all of the fluid flowing in said amplifier at any one time; a first annular control inlet channel in said tubular means around said annular fluid flow stream; a second annular control inlet channel in said tear-shaped divider within said annular fluid flow stream; and pressure differential means applied to said control inlet channels to shift said fluid flow stream between said outlet paths.

7. A cylindrical fluid amplifier including: tubular fluid inlet means having a tear-shaped divider supported therein to provide an annular fluid flow stream of a fluid to be controlled; two concentric fluid outlet pipes opposite said fluid inlet means; said pipes separating in a fluid tight joint thereby forming two fluid flow outlet paths each capable of handling all of the fluid flowing in said amplifier at any one time; an annular channel and control inlet in an outer wall of said tubular inlet means directed inwardly toward said fluid stream for introduction of a control fluid; and a second annular channel and control inlet directed outwardly from said tear-shaped divider toward said fluid stream for introduction of said control fluid; the application of said control fluid to a control inlet and channel shifting said fluid flow stream between said outlet flow paths in a direction away from said applied control inlet fluid.

No references cited.